Patented July 28, 1931

1,816,255

UNITED STATES PATENT OFFICE

RICHARD HESSEN, OF BAUTZEN, GERMANY

MANUFACTURE OF CONDENSATION PRODUCTS FROM PHENOL AND FORMALDEHYDE

No Drawing. Application filed November 3, 1928, Serial No. 317,107, and in Germany September 2, 1926.

This invention relates to the manufacture of condensation products from phenols and formaldehyde. It is well known that by basic condensation of phenols and formaldehyde so-called "resols" are formed, i. e. resin-like products capable of being hardened which are more or less unstable against light. This property is known to be caused by an amount of free phenols contained in the resins which phenols remain uncombined owing to the reaction being incomplete. Hitherto the chemists have not succeeded in eliminating this amount of free phenols, during or after the condensation, as phenols are the best solvents for phenol-formaldehyde condensation products and therefore firmly adhere to the latter.

Now it is essential to consider the theory of the conditions governing this reaction which is an incomplete reversible one subject to an equilibrium:— phenol + formaldehyde ⇆ resin + water.

To such a case the well-known physical-chemical rule applies:—

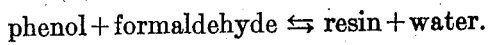

$$\frac{C_{phenol} \cdot C_{formaldehyde}}{C_{resin} \cdot C_{water}} = K.$$

When the reaction has fairly advanced so that the resin concentration is a very high one—which happens in most cases—the same may also be considered constant, and the water-concentration too, as a great quantity of water is formed. Consequently the equation is simplified to the less complex form:—

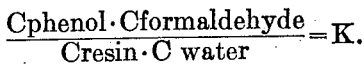

$$C_{phenol} \cdot C_{formaldehyde} = K'.$$

From this it results that by increasing the formaldehyde concentration the phenol concentration is diminished and products poorer in phenols and more stable against light must be obtained. This is practically likewise the case when a larger excess of formaldehyde is employed in order to increase the formaldehyde concentration. However this method involves the draw-back that a large excess of formaldehyde is required, besides that the resulting intermediary products are so viscous that the adhering water cannot be removed by evaporation.

Hereafter a method will be described by which with a relatively small excess of formaldehyde, products practically free from phenols and stable against light are obtained. Experiments have proved that by separating the liquid resin, produced by the phenol formaldehyde condensation, from the upper aqueous layer (consisting of solvent water, condensing water, free phenol, and free formaldehyde), adding a relatively small quantity of formaldehyde and heating the mixture, the intermediary product at first dissolves quite clearly in the formaldehyde. When this solution is allowed to boil for some time, the solution becomes turbid and layers are formed. This liquid resin again isolated already presents an extremely clear color and a low phenol content. By repeating these operations once or oftener, i. e. by again adding a small quantity of formaldehyde to the separated resin and again boiling up to separation, liquid intermediary products are obtained which after evaporation are absolutely free from phenols and stable against light.

This improved method is in accordance with the theory owing to the above-explained rule; however it is to be taken into consideration that this rule only applies to a homogeneous phase; in the present case, however, there are two phases equilibrating each other: the resin phase and the aqueous phase. To each of them the above formula may be applied. For instance, when applying to the resin phase the law governing the action of masses, it is to be noted that an addition of formaldehyde assists the latter but very little, as long as the aqueous phase is present, for the latter consumes the most part of the added formaldehyde. This was indeed to be expected by virtue of the distribution of the formaldehyde between the water phase and the resin phase.

Now when the aqueous layer is separated in the phenol-formaldehyde condensation, at first a part of the phenol contained in the water is removed including the water which otherwise would dissolve the formaldehyde. By hereafter adding formaldehyde to the resin thus liberated and boiling the mixture up to clearness, firstly a dilution of the phenol concentration is obtained and secondly the formaldehyde concentration is increased. In this way even by small additions of formaldehyde the equilibrium is shifted to a considerable extent in disfavor of the phenol. When this resin dissolved in formaldehyde is further boiled layers are again formed after some time, and according to the distribution-law part of the free phenol goes into the aqueous layer thereby being again withdrawn from the resin phase. Another part, however, combines with formaldehyde to form a resin. At the same time part of the formaldehyde is aggregated to the intermediary products present, forming products of higher molecular weight which are no longer subject to reversible decomposition. By repeated additions of formaldehyde to the separated resinous layers and subsequent condensations the phenol concentration may be rendered indefinitely small, i. e. the phenol content may be reduced at will.

My improved process may be carried out as follows:—

Equimolecular amounts of phenol or cresol and formaldehyde are refluxed in the presence of a basic contact substance until layers are formed. After cooling down, the resinous layer is separated from the aqueous layer and one fifth to one fourth of the originally employed quantity of formaldehyde is added. The resin dissolves, as a rule, in the formaldehyde to a clear solution its color being inversed. The batch is now heated until layers are formed. The separated resin is again separated from the upper aqueous layer, again ⅓ to ¼ of the formaldehyde originally employed is added and the solution is boiled as above described. After this operation has been carried out a few (2 to 4) times, a resin is obtained in which no more phenol can be tested. As by the repeated additions of formaldehyde, and the subsequent separation of water, the basic contact substance is partially removed, any desired fraction of the originally employed or any other basic contact substance may be added after the addition of formaldehyde, i. e. before each reaction, should the reactions, i. e. the formation of layers, not take place as rapidly as desired. For neutralizing the base finally remaining in the resin any desired inorganic (except nitric) or organic acid or other acid substances may be added. Thereupon the resulting salt is removed by extraction with water. This may be effected according to the counter-current principle or simply by repeated washing with fresh quantities of distilled water. If the resulting salts are insoluble in water the product is dissolved in alcohol, the insoluble salts are filtered off and the filtrate is evaporated. The resins thus obtained are relatively thin fluids and are easily freed from water by evaporation. The solid resins are clear as water, soluble in alcohol, acetone, caustic soda solution etc. and may be hardened by applying temperatures beginning from 60° C.

*Example 1*

100 parts by weight of phenol, 80 parts by weight of formaldehyde (40%), 1 part by weight of sodium carbonate (anhydrous) are refluxed until layers are formed. After removing the aqueous layer 15 parts by weight of formaldehyde of 40% are added and the mass is boiled until again layers are formed. After the last-named operations have been repeated three time the base remaining in the liquid resin is neutralized with a 5% tartaric acid solution, the resulting salt is washed out with distilled water and the resinous solution is evaporated until the desired hardness is obtained.

*Example 2*

100 parts by weight of cresol, 80 parts by weight of formaldehyde (40%), 3 parts by weight of barium hydroxide are refluxed until separation takes place. After removing the aqueous layer 20 parts of formaldehyde are added and the mass is boiled until again layers are formed. This last operation is again repeated, the base retained in the resin is neutralized with a 0.5% sulfuric acid, the washed resin is dissolved in alcohol and the barium sulfate formed is filtered off or separated by suction. The resin thus obtained is evaporated until the desired degree of hardness is reached.

I claim:

1. The process of producing condensation products from a phenol and formaldehyde, which comprises mixing the phenol and the aldehyde in equimolecular proportions, adding a basic contact substance, condensing until the mass separates into layers, mechanically separating the aqueous layer, adding formaldehyde to the resinous layer and condensing, repeating the steps of separation of the aqueous layer, adding formaldehyde and condensing until no free phenol is present in the resinous layer, and then evaporating to the desired consistency.

2. The process of producing condensation products from a phenol and formaldehyde, which comprises mixing the phenol and the aldehyde in equimolecular proportions, adding a basic contact substance, condensing until the mass separates into layers, mechanically separating the aqueous layer, adding formaldehyde and a basic contact substance to the resinous layer and condensing, repeating the steps of separation of the aqueous layer, adding of formaldehyde and condensing until no free phenol is present in the resinous layer, and then evaporating to the desired consistency.

In testimony whereof I affix my signature.

RICHARD HESSEN.